United States Patent [19]
Farmer

[11] 3,800,122
[45] Mar. 26, 1974

[54] SELF-HEATING WAX MODELING SPATULA

[76] Inventor: Everett L. Farmer, 12970 Cranston Ave., Sylmar, Calif. 91342

[22] Filed: Jan. 17, 1973

[21] Appl. No.: 324,252

[52] U.S. Cl. .................. 219/239, 32/70, 219/229, 219/241, 219/242, 219/533
[51] Int. Cl. .................................... H05b 1/00
[58] Field of Search .................... 219/221–242, 219/533; 32/70

[56] References Cited
UNITED STATES PATENTS

| | | | |
|---|---|---|---|
| 1,525,512 | 2/1925 | Post | 219/239 |
| 1,656,690 | 1/1928 | Blackburn | 219/236 |
| 1,905,987 | 4/1933 | Lane | 219/236 |
| 1,909,774 | 5/1933 | Lindsay | 219/236 |
| 2,031,532 | 2/1936 | Goldman | 219/239 |
| 2,097,098 | 10/1937 | Hiscox | 219/237 |
| 2,185,266 | 1/1940 | Raffles | 219/239 |
| 2,119,908 | 6/1938 | Ellis | 219/229 |
| 2,468,818 | 5/1949 | Fox et al. | 219/239 |
| 3,120,598 | 2/1964 | Westerback et al. | 219/229 |

Primary Examiner—A. Bartis
Attorney, Agent, or Firm—Dominick Nardelli

[57] ABSTRACT

A self-heating wax modeling spatula is disclosed, having disposed within a handle an electrc heating element with a thermal controlled switch, which turns on the current when the element cools below a predetermined temperature and turns off the current when the element heats above a predetermined temperature. The working tip is thermally connected to the heating element through a heat conductor of a known heat conductivity rate, so that the working tip is maintained between upper and lower temperature limits that are closer than the thermal controlled switch is capable of maintaining the heating element. The heating element, the heat conductor, and the working tip being separate items and are biased, in turn, against one another in butting relationship by a suitably disposed spring means to allow heat flow. To further bring the upper and lower temperature limits together at the working tip, the tip is made of a metal that has a relatively high density, is non-corrosive and is a good heat conductor.

10 Claims, 2 Drawing Figures

3,800,122

SELF-HEATING WAX MODELING SPATULA

FIELD OF THE INVENTION:

The present invention relates to a wax modeling spatula that is electrically heated, and more particularly, means for maintaining the working tip of the spatula at a relatively constant temperature.

BACKGROUND OF THE INVENTION:

The spatulas presently used in dental labs are of steel and, in use, are intermittently heated over a gas flame. The tip of the spatulas are relatively thin so that the heat is rapidly dissipated when it touches the cool wax. Therefore the spatula must be constantly reheated in the flame, which is time consuming. If one gets the tip too hot, more time is consumed to cool it to the right temperature. Thus, the operator or the model maker should be relatively proficient in order to operate economically.

The prior art discloses an electonically heated spatula, but these have never gained a foothold in the dental laboratory field because, in my opinion, the tips are subjected to relatively wide extremes of temperature — either too hot or too cold, as the current is switched on and off. Such spatulas are disclosed in the following U.S. Pat. Nos.: 625,354; 1,909,774; 2,119,908; 2,243,400; and 2,446,818.

SUMMARY OF THE INVENTION

The invention combines a cylindrical electrical heater, a cylindrical metallic heat conductor, and a metallic working tip, having a relatively high density metal with good heat conductivity. The heat conducting rate of the working tip is better than the heat conductor so that the working tip is maintained at a relatively uniform temperature although the electrical heater is switched on and off within relatively wide upper and lower temperature limits.

OBJECTS OF THE INVENTION:

An object of this invention is to provide an electrically heated spatula wherein the tip is maintained between closer temperature extremes than spatulas of the prior art.

Another object is to provide an electrically heated spatula wherein the current to the heating element is cycled by a thermally controlled switch and heat storage and conduction means are disposed between the working tip and the heating element.

Another object of this invention is to provide a tip for an electrically heated spatula wherein the tip is made of a dense, non-corrosive metal, with good heat conductivity characteristics.

These and other objects and features of advantage will become more apparent after studying the following description of the preferred embodiment of this invention, together with the appended drawing.

Figure 1:
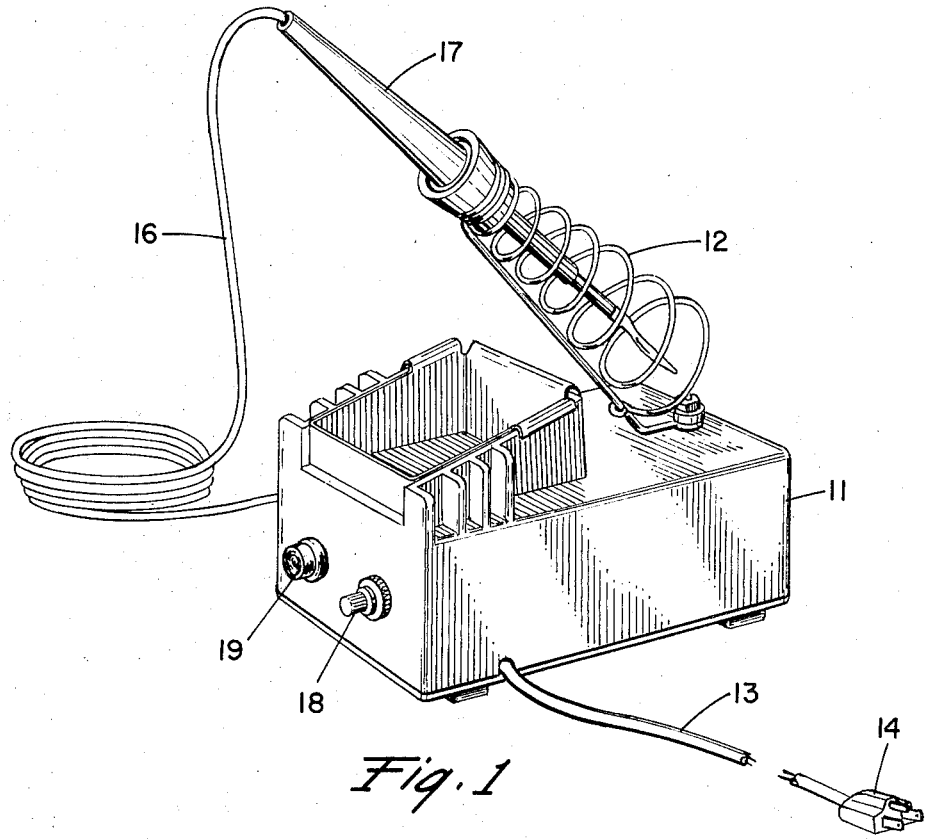
FIG. 1 is a pictorial view of the self-heating wax modeling spatula.

DETAILED DESCRIPTION OF THE DRAWING:

Referring to FIG. 1, the self-heating wax modeling spatula is pictorially shown and has a stand 11 on which is mounted a heater support 12 made of coiled rod. An electric lead 13 with a standard male plug 14 extends out from the stand 11 on one side and from the other a heater electrical lead 16 extends to couple current from the stand 11 to a heater wand 17. On the stand 11 is mounted a standard on-off switch 18, and an on-indicating light 19. Within the stand may be enclosed a transformer so that the current voltage to apply to the wand 17 may be different than the house power, if need be.

Figure 2:
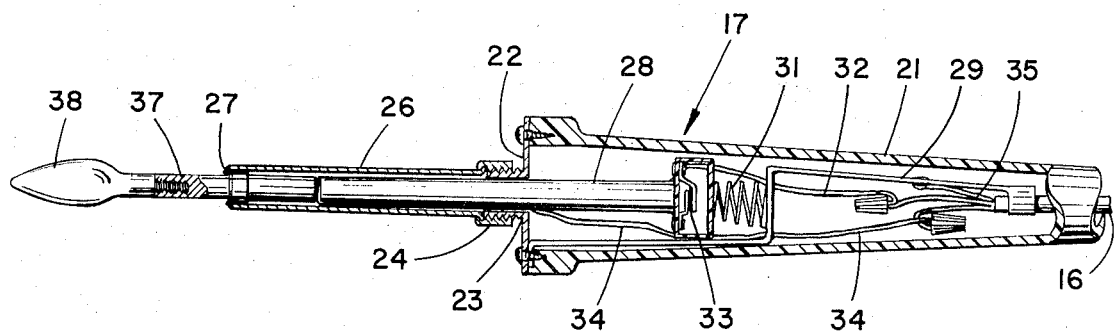
FIG. 2 is an axial section of the heater wand of FIG. 1.

Referring to FIG. 2, I will endeavor to explain the novel structure that allows one to effectively and officially use the heater wand 17 for wax modeling. The wand 17 has a plastic handle 21 which is, of course, heat insulating and that has the lead 16 extending from one end. At the other end is disposed an apertured end plate 22 with a threaded boss 23 around the aperture thereof. Screwed on the boss 23 is a nut 24 that engages a relatively thin sleeve 26 having a slightly in-turned flange 27. Within the handle 21 and extending through the aperture in the end plate 22 is a heating element 28 that is suitably mounted to a Z-shaped mounting bracket 29 by a compression spring 31 that biases the element outward for reasons that will become apparent hereinafter. A wire 32 from lead 16 couples current to the termally activated switch 33 and then to the element 28. Another wire 34 returns the current to lead 16. A ground wire 35 is also used. The left end of the element 28, as viewed in the drawing, contacts the heat conductor 37 made of a metal which has been chosen for its known rate of heat conductivity, and being metal, inherently has thermal mass to help smooth out the temperature extremes of the element 28. To further smooth out temperature variations, a working tip 38 is mounted on the heat conductor 37, as shown, and the tip 38 is also made of metal that has the characteristics of being dense, non-corrosive and a relatively good heat conductor. Preferably, the heat conduction rate of the working tip is better than the rate of the heat conductor 37. Typical suitable metals out of which the working tip may be made are brass, copper, silver, gold, alloys of iron, stainless steel and alloys of copper-zinc-nickel (monel).

In operation, when the switch 18 is switched on, current passes through the thermally activated switch 33 since it is closed and the element 28 becomes hot. Heat is conducted by the conductor 37 to the tip 38. When the temperature of the element 28 rises to a predetermined level, switch 33 opens and the element 28 cools until switch 33 again closes. Thermally activated switches inherently have a relatively large thermal lag wherein the upper and lower temperature limits may extend well above and well below the melting temperature of the wax. However, I find that the upper and lower limits at my tip 38 are held quite close to the wax melting temperature wherein I can work the wax without excessive melting thereof. The reason I believe why my working tip is maintained between closer upper and lower temperature limits could be due to the facts that a heat conductor is used between the heating element and the tip, and that the tip being of a metal which has a higher heat conductivity rate than the heat conductor, whereby the tip can rapidly convey heat from one end to the other. The tip is preferably made of an non-corrosive element because wax inherently reacts with a number of metals forming oxides on the metal surface which inherently may be rough and unsuitable for the operation of making wax dental forms.

I have described the preferred embodiment of the invention, and the invention is not to be considered limited to the disclosed embodiment, for one skilled in the art, after studying the above teachings, may discover other embodiments which fall within the scope of the invention. Therefore the invention is to be considered limited by the claims only.

I claim:

1. In combination:

a heat insulated tubular handle;

electrical leads extending out of one end of said handle;

a thin metallic sleeve secured at one end to the other end of said handle and extending from the other end of said handle;

a resistance heating cylindrical axially disposed element connected to said leads and having a portion slidably disposed within said handle and the rest thereof within said sleeve;

means within said handle for biasing said element out of said handle toward the other end of said sleeve;

a cylindrical heat conductor having a portion fixedly positioned in the other end of the sleeve and having an exterior end extending out of said sleeve;

said heating element being biased by said means for biasing into heat transfer engagement with the portion of the heat conductor within said sleeve;

a metallic working tip fixed to the exterior of said conductor; and a thermally activated switch in the circuit with said heating element and positioned in said handle relative to said heating element so as to be responsive to the temperature of said heating element to open the electrical circuit of the heating element whenever said element is at a predetermined elevated temperature limit and closing the circuit whenever said temperature is below a predetermined lower temperature limit, to cool and heat said element respectively.

2. The combination of claim 1 wherein:

means are provided on the outer end of said sleeve to prevent the heat conductor from moving axially out of said sleeve to allow said means for biasing to cause said heating element to bear against said heat conductor and said heat conductor having a thermal conductivity which is lower than the thermal conductivity of said metallic tip.

3. The combination of claim 1 wherein:

said metallic working tip is made of a thin non-corrosive metal, having a good thermal conductivity.

4. The combination of claim 3 wherein said metal is chosen from a group consisting of brass, copper, silver, gold, alloys of iron, alloys of copper-zinc-nickel and stainless steel.

5. The combination of claim 3 wherein said metal is brass.

6. The combination of claim 3 wherein said metal is silver.

7. The combination of claim 3 wherein said metal is stainless steel.

8. The combination of claim 3 wherein said metal is an alloy of copper and zinc and nickel.

9. The combination of claim 1 wherein said tip and said conductor are fixed together by an axially disposed screw thread means.

10. The combination of claim 3 wherein means are provided on the outer end of said sleeve to prevent said heat conductor from moving axially out of said sleeve to allow said means for biasing to cause said heating element to bear against said heat conductor, and said heat conductor having a low rate of thermal conductivity than said working tip.

* * * * *